(12) United States Patent
Burton

(10) Patent No.: US 6,270,259 B1
(45) Date of Patent: Aug. 7, 2001

(54) POWDERED METAL SINTERED BEARING WITH IMPROVED OIL FLOW POLYGONAL INTERIOR BORE

(75) Inventor: Stephen J. Burton, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/392,420

(22) Filed: Sep. 9, 1999

(51) Int. Cl.$^7$ .................................................. F16C 23/04
(52) U.S. Cl. ............................................. 384/213; 384/902
(58) Field of Search ............................. 384/902, 279, 384/291, 286, 289, 213

(56) References Cited

U.S. PATENT DOCUMENTS

| | | |
|---|---|---|
| 2,796,659 | 6/1957 | Buske . |
| 3,205,027 | 9/1965 | Hilton . |
| 3,829,178 * | 8/1974 | Sakamoto .............................. 384/132 |
| 4,026,657 | 5/1977 | Chmura . |
| 4,059,879 | 11/1977 | Chmura et al. . |
| 4,432,659 * | 2/1984 | Tuckey ................................. 384/300 |
| 4,558,960 | 12/1985 | Lehtinen et al. . |
| 4,711,590 | 12/1987 | Lakin . |
| 5,120,091 | 6/1992 | Nakagawa . |
| 5,129,738 | 7/1992 | Nakagawa . |
| 5,447,376 | 9/1995 | Cunningham . |
| 5,456,535 | 10/1995 | Chen et al. . |
| 5,480,234 | 1/1996 | Chen et al. . |
| 5,785,429 | 7/1998 | Jeong . |

FOREIGN PATENT DOCUMENTS

| | | |
|---|---|---|
| 2362301 | 3/1978 | (FR) . |
| 470141 | 8/1937 | (GB) . |

OTHER PUBLICATIONS

R. Junghans et al. "The use of sintered metal bearings for high sliding velocities", Tribology International, vol. 29, No. 3, pp. 181–192, 1996.

* cited by examiner

Primary Examiner—Lenard A. Footland
(74) Attorney, Agent, or Firm—Howell & Haferkamp, L.C.

(57) ABSTRACT

A powdered metal sintered bearing has a polygonal interior bore with areas of increased density for load bearing and areas of less density that improve its ability to provide a flow of oil from the external surface of the bearing to the bore.

30 Claims, 3 Drawing Sheets

POWDERED METAL SINTERED BEARING WITH IMPROVED OIL FLOW POLYGONAL INTERIOR BORE

BACKGROUND OF THE INVENTION (1) Field of the Invention

The present invention pertains to the construction and method of constructing a powdered metal sintered bearing having a polygonal interior bore that improves its ability to provide a flow of oil to the bore.

(2) Description of the Related Art

Metal-powder-sintered bearings or powdered metal sintered bearings are porous bearings that can operate for long periods of time without being resupplied with additional lubrication. An example of such a bearing 12 is shown in FIGS. 1 and 2. Referring to FIG. 2, the bearing shown is a spherical sintered bearing with its exterior surface 14 having a generally spherical configuration. A cylindrical center bore 16 passes through the bearing and supports a motor shaft for relative rotation therein. A cross-section of the bearing 12 is shown in an operative environment in FIG. 1. The bearing is retained in a two part circular enclosure 18 that also contains a lubricant absorbent wicking material 22. In many applications, the wicking material 22 is exposed to a lubricant reservoir of the electrical device in which the bearing 12 is employed through an opening provided in the enclosure 18. The wicking material 22 absorbs the lubricant and thus provides a source of lubricant around the entire exterior surface 14 of the bearing. The powdered metal sintered bearing 12 is porous and the lubricant contained in the wicking material 22 passes through the bearing from its exterior surface 14 through to the center bore 16 where it provides lubricant to the rotating shaft supported by the bearing. The operative environment shown in FIG. 1 is only one general example of how powdered metal sintered bearings are used and many other use environments also exist. This type of bearing is particularly useful in applications where it may be inaccessible or inconveniently accessed making it impossible or in the least difficult to lubricate the bearing. The bearings are often referred to as sliding bearings and also spherical bearings. They are primarily used in applications where they will experience light to medium loads and where a bearing of relatively small size is needed. For example, they are often used in electric motors that operate household appliances such as dishwashers, clothes washers and dryers, etc.

As suggested by their name, the bearings are made by compressing mixtures of metals such as copper and tin, or graphite, iron, or teflon. The mixtures are compressed into the desired form of the bearing and then the form is sintered in a reducing atmosphere (or increasing pressure) forming the powdered metal into a coherent mass by the heating without melting the powdered metal. The process forms a porous metal bearing. The porosity of the bearing allows the lubricant to be conveyed through the bearing from its exterior surface to its interior bore that supports a rotating shaft of an electric motor.

As is known in manufacturing powdered metal bearings, the greater the compacting force, the stronger the bearing formed by the powdered metal. The greater compacting force applied to the powdered metal in the molding process gives the bearing formed greater strength to resist wear and fragmentation of the powdered metal in use. However, the more compacting force that is applied to the powdered metal in the molding process decreases the porosity of the bearing formed. Thus, producing a stronger bearing by increasing the compacting force has the disadvantage of reducing the porosity of the bearing and thus reducing its ability to convey lubricant from its exterior through to the interior bore of the bearing.

Powdered metal sintered bearings are also limited in their areas of use due to their construction. These types of bearings have been known to fail when subjected to unbalanced loads or too high of a load. Powdered metal bearings experience failures when subjected to unbalanced load conditions because the loading of one area of the bearing's interior bore tends to close off the bearing porosity in that unbalanced loaded area and starves the journal or bore of oil in this area due to the closing of the pores. With the closing of the pores, lubricant is prevented from reaching the unbalanced loaded area of the bore causing metal to metal contact between the bearing bore and the rotating shaft it supports which increases wear and temperature which could ultimately lead to the failure of the bearing. It is necessary that the entire perimeter or interior circumference of the bearing interior bore remain porous and permeable to supply oil to the journal. When the load on the bearing is too high, the pressure exerted by the motor shaft on the loaded area of the bearing interior bore forces oil back into the porosity of the bearing in the loaded area allowing metal to metal contact which increases wear and temperature and could ultimately lead to the failure of the bearing.

What is needed to overcome the problems experienced with prior art powdered metal sintered bearings is a powdered metal sintered bearing having areas of its interior bore and its exterior surface that are compacted for strength to provide load bearing surfaces that resist wear and fragmentation of the powdered metal in use of the bearing, and also has areas in its interior bore and on its exterior surface of greater porosity or less density of the powdered metal providing a porous path for conveying lubricant from the exterior surface of the bearing to the bearing interior bore.

SUMMARY OF THE INVENTION

The powdered metal sintered bearing of the invention has improved wear resistant characteristics as well as enhanced oil flow characteristics from its exterior surface through to its interior bore. The method of constructing the powdered metal bearing is similar to that of prior are powdered metal bearings but includes additional steps that give the bearing its unique construction and improved wear resistance and porosity characteristics.

The bearing is constructed from the same types of materials as conventional powdered metal sintered bearings. It may be constructed as a spherical bearing or as a cylindrical sliding bearing. The bearing has a generally cylindrical exterior surface or a generally spherical exterior surface depending on its application. A bore extends through the center of the bearing between axially opposite end faces of the bearing. The bearing differs from prior art sintered metal bearings in that its inner bore has a polygonal cross-section. The bore is formed by a plurality of flat surfaces that, in the preferred embodiment, are of the same area. The flat surfaces intersect with each other along lines of intersection that are parallel to the center axis of the bearing bore. Intermediate each of the flat surfaces is an arcuate surface that is recessed radially into the flat surface. The arcuate surfaces also extend axially across the flat surfaces of the interior bore. The arcuate surfaces and the portions of the volume of bearing material adjacent the arcuate surfaces are more dense and less permeable or less porous than is the volume portion of material that is radially outward from the arcuate surfaces and adjacent the lines of intersection of the flat surfaces. Thus, the volume portion of bearing material surrounding and adjacent to the lines of intersection of the interior bore is more porous and more permeable than the arcuate surfaces. In the preferred embodiment, the arcuate surfaces have a radius of curvature that is complimentary to the dimensions of the shaft which the bearing will support. Thus, the arcuate surfaces of the interior bore function as load bearing surfaces that are more dense and more resistant to wear and fragmentation than the remainder of the bore interior surface. The portions of the flat surfaces adjacent the lines of intersection in the interior bore function as the lubricant conveying and supplying surfaces to the shaft which will be supported by the bearing.

The load bearing and lubricant conveying characteristics of the bearing are further enhanced by the construction of the exterior surface. With the exterior surface having previously been compressed and sintered to increase its load bearing characteristic, axial slots or notches are cut into the exterior surface. The axial surface slots remove the compacted more dense material adjacent the exterior surface and expose the more porous, permeable material recessed inside the bearing below the exterior surface. When the material in the bearing notches is exposed to lubricant by a lubricant impregnated wicking material surrounding the bearing, the increased porosity of the material in the slots or notches more readily accepts the lubricant than the compacted, more dense material adjacent the exterior surface of the bearing. To further enhance the lubricant conveying characteristic of the bearing, the slots or notches are positioned on the exterior surface radially outwardly from the lines of intersection of the interior surface. This reduces the volume of the bearing through which the lubricant must pass to egress from the more porous material of the bearing adjacent the lines of intersection in the bearing bore.

In the manner discussed above, the powdered metal sintered bearing of the invention provides more dense load bearing surfaces that resist wear and fragmentation in combination with more porous and permeable lubricant conveying paths through the bearing from its exterior surface to its interior bore.

BRIEF DESCRIPTION OF THE DRAWINGS

Further objects and features of the unique bearing are presented in the following detailed description of the bearing and in the drawings wherein.

DETAILED DESCRIPTION OF THE PREFERRED EMBODIMENTS

Figure 3:
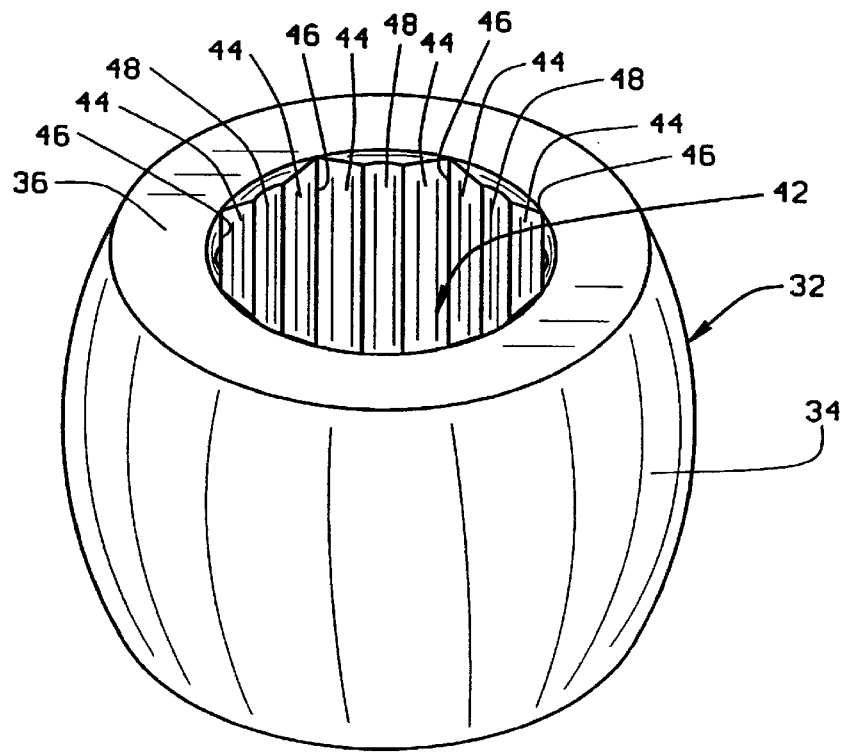
FIG. 3 is a perspective view of a first embodiment of the bearing of the invention.
Figure 4:
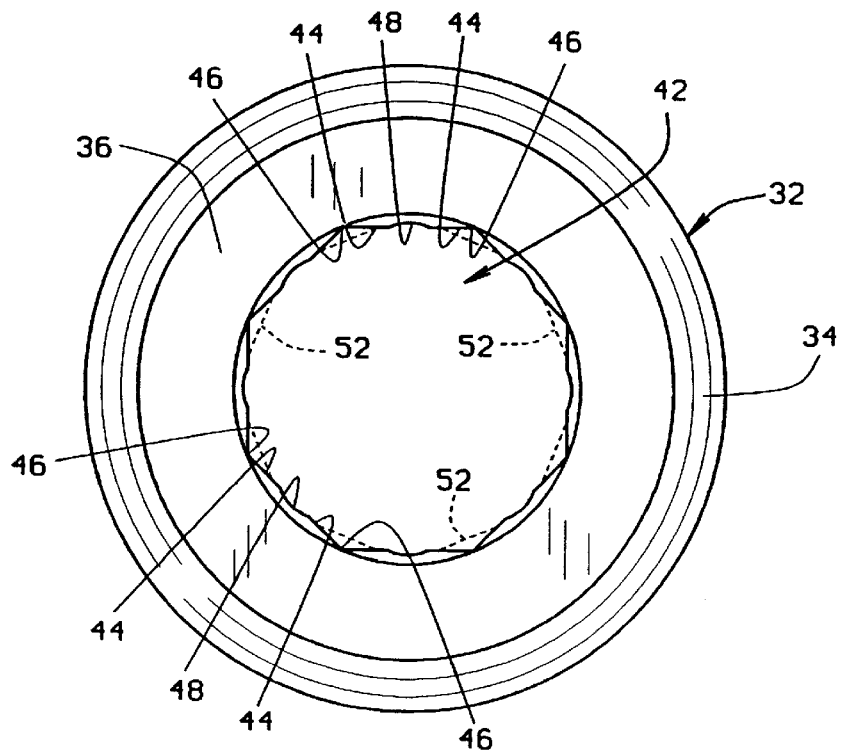
FIG. 4 is an end plan view of the bearing of FIG. 3.
Figure 5:
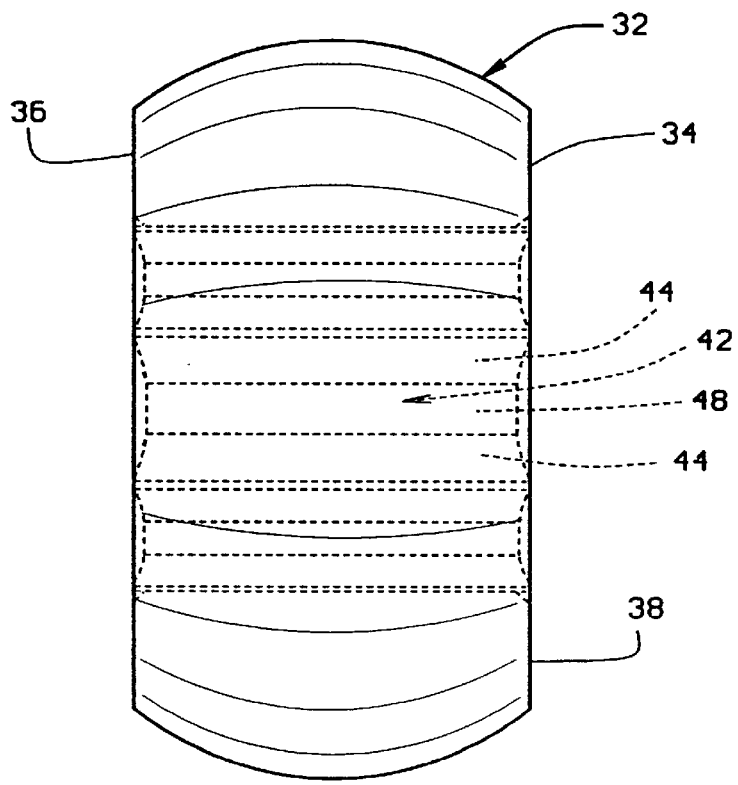
FIG. 5 is a side elevation view of the bearing of FIG. 3.

The powdered metal sintered bearing 32 of the invention is shown in FIGS. 3–5. The bearing 32 is constructed of the same types of materials employed in constructing prior art sintered bearings. The bearing shown is a spherical bearing having an exterior surface 34 of a generally spherical configuration. The concepts of the bearing to be described could also be employed on a cylindrical bearing. The exterior surface 34 extends between two end faces 36, 38 of the bearing that are generally parallel to each other. A bore 42 passes axially through the center of the bearing between the two end faces 36, 38. The configuration of the interior bore 42 differentiates this embodiment of the bearing from prior art bearings.

The interior surface of the bore 42 is comprised of a plurality of flat surfaces 44 that give the bore a general polygonal cross-section as seen in FIG. 4. In the embodiment of the bearing shown, the flat surfaces 44 are of the same area. In alternate embodiments, the flat surfaces could have different areas. The flat surfaces 44 intersect with each other along lines of intersection 46 that extend parallel and axially through the bearing center bore 42. The lines of intersection 46 form vertices of the polygonal bore 42. Intermediate each of the flat surfaces 44 is an arcuate surface 48 that is recessed radially into the flat surface. The arcuate surfaces 48 also extend axially across the flat surfaces of the interior bore. The curvature of the arcuate surfaces 48 is exaggerated in the drawing figures so that their positions relative to the flat surfaces 44 and the lines of intersection 46 in the bore 42 may clearly be seen. In the preferred embodiment, the arcuate surfaces 48 have a radius of curvature that is complimentary to the dimensions of the shaft circumference which the bearing will support and which is represented by the dashed line 52 in FIG. 4. Thus, the arcuate surfaces 48 of the interior bore function as load bearing surfaces of the motor shaft.

The powdered metal sintered bearing 32 has improved wear resistant characteristics as well as enhanced oil flow characteristics from its exterior surface 34 through to its interior bore 42. The method of constructing the powdered metal bearing is similar to that of prior art powdered metal bearings but includes additional steps that give the bearing its unique construction and improved wear resistance and porosity characteristic.

In constructing the powdered metal bearing 32, the selected mixture of powdered metal is first put into a mold of the bearing and is then compacted in the mold to give the bearing its spherical shape with its polygonal center bore 42. The greater the compacting force applied, the stronger is the bearing formed from the powdered metal material. The more compacting force applied to the powdered metal material in the mold gives greater strength to the bearing formed to resist wear and fragmentation in use. However, the more compacting force that is applied to the powdered metal in the mold decreases the porosity of the bearing formed. The trade-off between increasing compacting force adding strength to the bearing and the desirability of having a porous bearing to allow lubricant to pass therethrough results in a preferred bearing formed from the compacted powdered metal material having a porosity of about 19%. However, depending on the particular application intended for the bearing, the porosity can be varied by adjusting the compacting force. Following the compacting of the powdered metal bearing 32 in the mold, the bearing is removed from the mold and is heat sintered in the known manner of manufacturing powdered metal bearings. Thus, the only difference in the construction of the powdered metal bearing 32 at this point in its manufacture from known constructions of powdered metal bearings is that its interior bore has the polygonal shape formed by the flat surfaces 44 and the lines of intersection 46. The arcuate surfaces 48 have not yet been formed into the flat surfaces 44.

Following the sintering process, the bearing is moved to a further work station where a mandrel or pin is inserted through the center bore 42 of the bearing. The mandrel is expanded radially and curved surfaces come into engagement with the middles of the flat surfaces 44 of the bearing bore. The curved surfaces of the mandrel then further compact the material of the powdered metal bearing forming the arcuate surfaces 48 in the centers of the bore flat surfaces 44. This forming of the arcuate surfaces 48 in the flat surfaces 44 further compacts the volume portions of the bearing material immediately adjacent the arcuate surfaces 44. These volume portions of material adjacent the arcuate surfaces 44 are more dense than the remaining volume portion of material of the bearing due to this compacting process of forming the arcuate surfaces. Furthermore, the volume portion of material adjacent the flat surfaces 44 and the lines of intersection 46 of the flat surfaces in the interior bore 42 are more porous or more permeable than are the volume portions of material adjacent the arcuate surfaces 48 due to the further compacting process that forms the arcuate surfaces. As stated earlier, the arcuate surfaces 48 formed by the mandrel into the interior surface of the bore 42 formed spatially arranged arcs of a circle that corresponds to the circular cross-section of the motor shaft with which the bearing will be used.

At the same time of compacting the arcuate surfaces 48 of the interior bore 42, or in a subsequent step with the expanded mandrel still in the interior bore, the outer peripheral exterior surface 34 of the bearing is further compacting making the outer surface more dense than the powdered metal material in the interior volume of the bearing between the outer or exterior surface 34 and the inner arcuate surfaces 48 of the bearing bore. This further compacting of the exterior surface 34 increase the density of the bearing material adjacent the exterior surface 34 and increases its strength for functioning as a load bearing surface. Depending on the intended application of the bearing, this further compacting of the exterior surface 34 may be eliminated.

Figure 1:
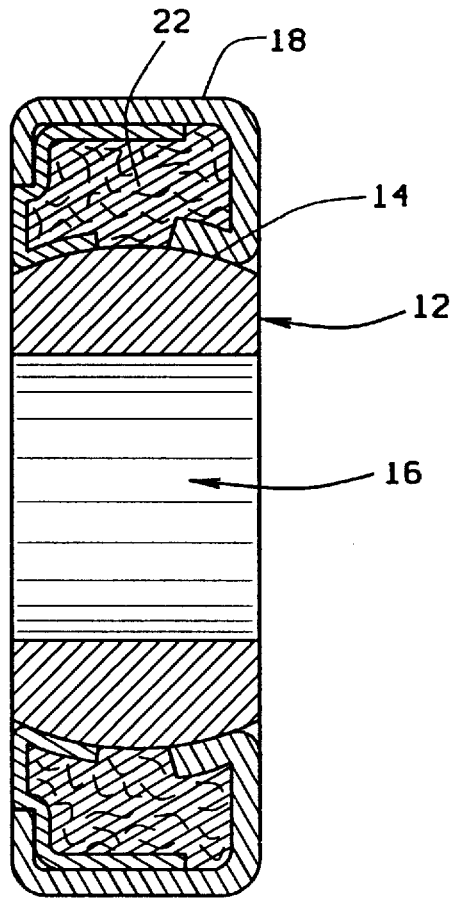
FIG. 1 is a side elevation view, in section, of a conventional spherical powdered metal sintered bearing in its operative environment.
Figure 2:
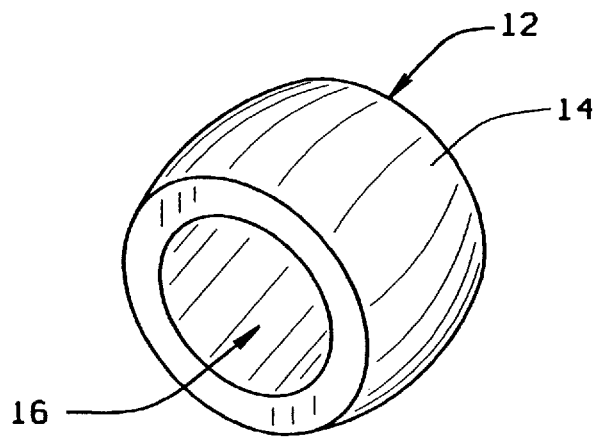
FIG. 2 is a perspective view of the bearing of FIG. 1.

With the bearing of FIGS. 3–5 employed in an environment similar to that of FIG. 1, the lubricant contained in the wicking material 22 is exposed to the exterior surface 34. Although the exterior surface 34 could be more dense than the remainder of the bearing material just behind the exterior surface, the lubricant will eventually pass through the pores of the more dense material and reach the less dense, more porous and permeable material in the interior volume of the bearing. The lubricant is conveyed through the porous material of the bearing toward the bearing center bore 42. With the particular construction of the center bore described, the lubricant will reach the more porous and more permeable bearing material adjacent the flat surfaces 44 of the bore and the lines of intersection 46. Because the material in these areas has not been further compacted and is not as dense as the material adjacent the arcuate surfaces 48, the lubricant may more readily pass through these areas of the interior bore and reach the motor shaft support by the arcuate surfaces 48 in the bore 42. In this manner, the bearing of the present invention provides more dense load bearing surfaces that resist wear and fragmentation in combination with more porous and more permeable lubricant conveying paths through the bearing from its exterior surface to its interior bore.

Figure 6:
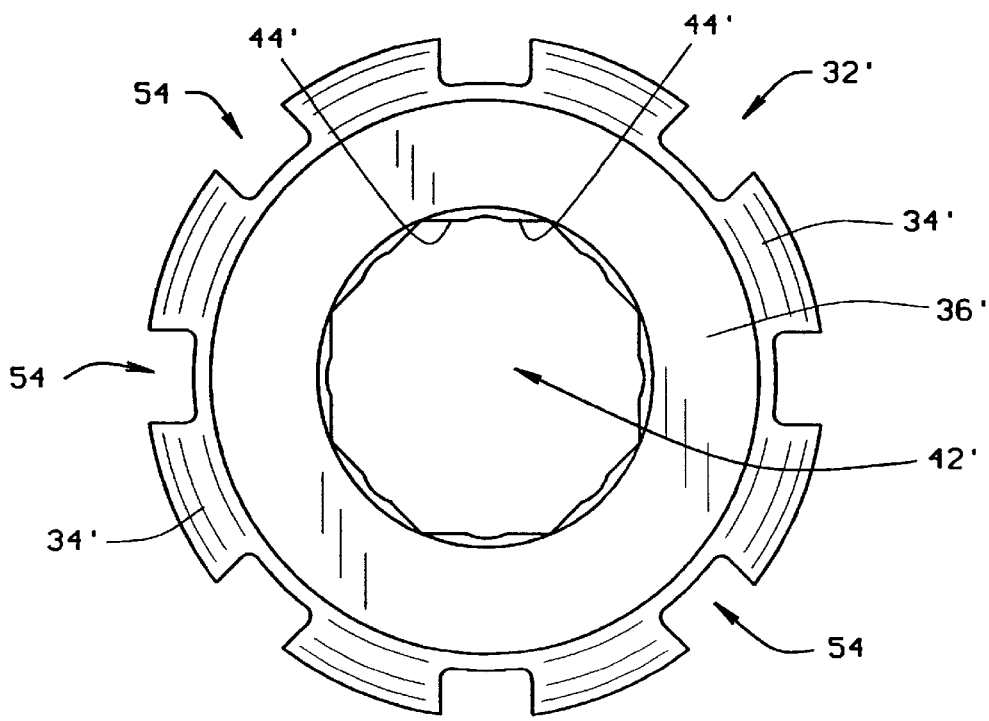
FIG. 6 is an end plan view of a variant embodiment of the bearing of FIG. 3.

FIG. 6 shows a variant embodiment of the bearing of FIGS. 3–5 that is formed with an additional manufacturing step. With the bearing of FIGS. 3–5 constructed in the manner discussed above, axial grooves or notches 54 are formed into the exterior surface 34 of the bearing. The notches are formed in the exterior surface in the initial molding of the bearing. The bearing is then heat sintered as with the previously described embodiment. Following the heat sintering, while the arcuate surfaces 48' are being formed in the bearing center bore 42', the exterior surface 34' is compacted or sized. This results in the material at the exterior surface being more dense than the material in the notches 54 and the material in the notches being more porous than the material at the exterior surface 34'. This allows lubricant in the wicking material 22 to more readily penetrate into the more porous and more permeable material of the bearing material through the less dense and more porous material exposed by the grooves or notches. As can be seen in FIG. 6, the grooves or notches 54 also reduce the radial distance the lubricant must travel through the pores of the bearing to reach the bearing interior bore. The positions of the outer grooves or notches 54 cut into the bearing exterior surface 34 coincide with the vertices formed by the lines of intersection 46 of the polygonal interior bore. This positioning of the grooves or notches 54 further reduces the distance for the oil to travel through the bearing to reach the interior bore.

As in the previously described embodiment, the sized or compacted arc surfaces 48 of the interior bore function as the load bearing surfaces of the bearing and the size or compacted exterior surfaces of the bearing between the grooves or notches 54 function as the load bearing surfaces.

In permeability testing of the two embodiments of the powdered metal sintered bearing described above, with the permeability of a standard prior art bearing having a round outside diameter and a round inside diameter measured at 564, it was found that the permeability of the same bearing having the polygonal inside diameter of the invention and a round outside diameter was increased to 607, and the permeability of the bearing of the invention having the polygonal inside diameter and slotted or grooved outside diameter was increased to 800.

While the present invention has been described by reference to a specific embodiment, it should be understood that modifications and variations of the invention may be constructed without departing form the scope of the invention defined in the following claims.

What is claimed:

1. A bearing comprising:
   a bearing body formed from a material, the body having an exterior surface;
   a bore passing through the body, the body having an interior surface that extends around the bore;
   the material of the body having a plurality of first volume portions and a plurality of second volume portions, the first volume portions of material each having a density that is greater than a density of each of the second volume portions of the material;
   the plurality of first volume portions are spatially arranged circumferentially around the bore interior surface and the plurality of second volume portions are spatially arranged circumferentially around the bore interior surface in an alternating arrangement with the plurality of first volume portions.

2. The bearing of claim 1, wherein:
   the plurality of first volume portions of material are also located in the bearing body adjacent the exterior surface.

3. The bearing of claim 2, wherein:
   the plurality of first volume portions of material are spatially arranged around the exterior surface.

4. The bearing of claim 3, wherein:
   a plurality of notches extend into the exterior surface and separate the plurality of first volume portions of material from each other.

5. A bearing comprising:

a bearing body formed from a material, the body having an exterior surface;

a bore passing through the body, the body having an interior surface that extends around the bore;

the material of the body having at least first and second volume portions, the first volume portion of material having a density that is greater than a density of the second volume portion of the material; and, the bore is polygonal and the interior surface is comprised of a plurality of flat surfaces that intersect with each other along lines of intersection.

6. The bearing of claim 5, wherein:

the first volume portion of material is one of a plurality of first volume portions of material that each have a density that is greater than the density of the second volume portion of material and that are located in the body adjacent a flat surface of the interior surface.

7. The bearing of claim 6, wherein:

each of the plurality of first volume portions of material are located in the body away from the lines of intersection.

8. The bearing of claim 5, wherein:

the first volume portion of material is one of a plurality of first volume portions of material that each have a density that is greater than the density of the second volume portion of material and that are located in the body adjacent the exterior surface and are spatially arranged around the exterior surface in positions that are radially outward from the plurality of flat surfaces.

9. The bearing of claim 8, wherein:

a plurality of notches extend into the exterior surface and separate the plurality of first volume portions of material from each other.

10. The bearing of claim 9, wherein:

the plurality of notches are arranged around the exterior surface in positions that are radially outward from the lines of intersection.

11. A bearing comprising:

a bearing body formed from a material, the body having an exterior surface;

a bore passing through the body, the body having an interior surface that extends around the bore;

the material of the body having at least first and second volume portions, the first volume portion of material having a density that is greater than a density of the second volume portion of the material; and, the bore has a perimeter defined by the interior surface and the interior surface is comprised of a plurality of arced surfaces that are spatially arranged around the perimeter.

12. The bearing of claim 11, wherein:

the first volume portion of material is one of a plurality of first volume portions of material that each have a density that is greater than the density of the second volume portion of material and that are located in the body adjacent an arced surface of the interior surface.

13. The bearing of claim 12, wherein:

the interior surface is also comprised of a plurality of flat surfaces that space the plurality of arced surfaces from each other.

14. A bearing comprising:

a bearing body formed from a material, the body having an exterior surface; and a bore passing through the body, the body having an interior surface that extends around the bore, the bore being polygonal with the interior surface being comprised of a plurality of flat surfaces the intersect with each other along lines of intersections; and, the interior surface is also comprised of a plurality of arced surfaces in the plurality of flat surfaces.

15. The bearing of claim 14, wherein:

the bearing body exterior surface is spherical.

16. The bearing of claim 14, wherein:

a plurality of notches extend into the exterior surface.

17. The bearing of claim 16, wherein:

the plurality of notches are spatially arranged around the exterior surface in positions that are radially outward from the lines of intersection.

18. A bearing comprising:

a bearing body formed from a porous material, the body having an exterior surface;

a bore passing through the body, the body having an interior surface that extends around the bore; and the material of the body having at least two first volume portions and a second volume portion, the first volume portions of material having a porosity that is less than a porosity of the second volume portion of material; and the first volume portions are located in the bearing body at the bearing body exterior surface and at the bearing body interior surface and the second volume portion is located in the bearing body between the first volume portions.

19. A bearing comprising:

a bearing body formed from a porous material, the body having an exterior surface;

a bore passing through the body, the body having an interior surface that extends around the bore;

the material of the body having a plurality of first volume portions and a plurality of second volume portions, the first volume portions of material each having a porosity that is less than a porosity of each of the second volume portions of material; and the plurality of first volume portions are spatially arranged circumferentially around the bore interior surface and the plurality of second volume portions are spatially arranged circumferentially around the bore interior surface in an alternating arrangement with the plurality of first volume portions.

20. The bearing of claim 19, wherein:

the first volume portion of material is one of a plurality of first volume portions of material that each have a porosity that is less than the porosity of the second volume portion of material and the plurality of first volume portions of material are located in the bearing body adjacent the exterior surface.

21. A bearing comprising:

a bearing body formed from a porous material, the body having an exterior surface;

a bore passing through the body, the body having an interior surface that extends around the bore;

the material of the body having at least first and second volume portions, the first volume portion of material having a porosity that is less than a porosity of the second volume portion of material;

the first volume portion of material is one of a plurality of first volume portions of material that each have a porosity that is less than the porosity of the second volume portion of material and the plurality of first volume portions of material are located in the bearing body adjacent the exterior surface; and, the bore is polygonal and the interior surface is comprised of a plurality of flat surfaces that intersect with each other along lines of intersection and the first volume portions of material are arranged around the exterior surface in positions that are radially outward from the flat surfaces.

22. The bearing of claim 20, wherein:

a plurality of notches extend into the exterior surface and separate the plurality of first volume portions of material from each other.

23. The bearing of claim 22, wherein:

the plurality of notches are arranged around the exterior surface in positions that are radially outward from the lines of intersection.

24. The bearing of claim 20, wherein:

a plurality of notches extend into the exterior surface and separate the plurality of first volume portions of material from each other.

25. A bearing comprising:

a bearing body formed from a porous material, the body having an exterior surface;

a bore passing through the body, the body having an interior surface that extends around the bore;

the material of the body having at least first and second volume portions, the first volume portion of material having a porosity that is less than a porosity of the second volume portion of material; and, the bore is polygonal and the interior surface is comprised of a plurality of flat surfaces that intersect with each other along lines of intersection and the first volume portion of material is one of a plurality of first volume portions of material that each have a porosity that is less than the porosity of the second volume portion of material and that are located in the body adjacent a flat surface of the interior surface.

26. The bearing of claim 25, wherein:

each of the plurality of first volume portions of material are located in the body away from the lines of intersection.

27. A bearing comprising:

a bearing body formed from a porous material, the body having an exterior surface;

a bore passing through the body, the body having an interior surface that extends around the bore;

the material of the body having at least first and second volume portions, the first volume portion of material having a porosity that is less than a porosity of the second volume portion of material; and, the bore has a perimeter defined by the interior surface and the interior surface is comprised of a plurality of arced surfaces that are spatially arranged around the perimeter, and the first volume portion of material is one of a plurality of first volume portions of material that each have a porosity that is less than the porosity of the second volume portion of material and that are located in the body adjacent an arced surface of the interior surface.

28. A bearing comprising:

a bearing body formed from a material, the body having an exterior surface;

a bore passing through the body, the body having an interior surface that extends around the bore;

the material of the body having at least two first volume portions and a second volume portion, the first volume portions of material having a density that is greater than a density of the second volume portion of the material; and the first volume portions of material are located in the bearing body at the bearing body exterior surface and at the bearing body interior surface and the second volume portion is located in the bearing body between the first volume portions.

29. The bearing of claim 28, wherein:

the bore is polygonal and the interior surface is comprised of a plurality of flat surfaces that intersect with each other along lines of intersection.

30. The bearing of claim 28, wherein:

the bore is polygonal and the interior surface is comprised of a plurality of flat surfaces that intersect with each other along lines of intersection.

* * * * *